UNITED STATES PATENT OFFICE.

JOHN CAMPBELL, OF SPRING FORGE, PENNSYLVANIA, ASSIGNOR OF ONE-HALF HIS RIGHT TO EDGAR O. HOWLAND, OF MECHANICSVILLE, N. Y.

IMPROVEMENT IN PROCESSES AND LIQUORS FOR MANUFACTURING PAPER-PULP.

Specification forming part of Letters Patent No. 184,197, dated November 7, 1876; application filed July 17, 1875.

*To all whom it may concern:*

Be it known that I, JOHN CAMPBELL, of Spring Forge, county of York, and State of Pennsylvania, have invented new and useful improvements in the art of subduing and preparing vegetable fibrous substances for the manufacture of paper-pulp and other purposes; and I do hereby declare that the following is an exact and full description thereof.

My invention consists in boiling the straw, or any other vegetable fibrous material which abounds in silica and other proximates, in a chemical solution or liquor, which destroys the chemical combination between the fiber and the silica and other proximates without disturbing the mechanical combination or discharging the silica and other proximates into the liquor, but leaving the silica surrounding and protecting the fiber yet in such condition that it may be readily washed away in water, leaving the fiber free and clean; and my liquor, not being adulterated with silica and other proximates, remains caustic, and is used over and over again, requiring the addition of only a small quantity of chemicals and water to restore it again to its former strength and quantity.

By this process all the knots, weeds, and stubborn portions of the vegetable material used are completely subdued, while the finest fibers are preserved uninjured. The material acted upon may be subdued in from three to five hours, or it may be boiled for twenty-four or thirty-six hours after it is cooked without the fiber or stock being diminished in quantity or impaired in quality, and in many instances the form of the straw or other material is preserved unbroken, showing the leaf or sheath of the straw, and even the chaff on the head.

To enable others to make and use my invention, I will proceed to describe its operation.

For a boiler I use any suitable vessel. A close boiler may be used; but I prefer an open suitable vessel, in which I pack the straw or other vegetable fibrous material that is to be acted upon. The straw should be packed as closely as may be conveniently done, but not so closely as to prevent the free passage of the liquor through it while boiling. I prefer a vessel having a perforated or false bottom, and supplied with lifters or pumps, or other appliances for raising the liquor to make it flow over the straw or other material while it is boiling.

The chemical solution or liquor which I use is made by the combination of pure caustic alkali liquor, made with soda-ash and lime by the usual and well-known formula, with potash and any vegetable or animal or fish oil.

In my practice, as I am now using this process, for a batch of four thousand pounds of rye-straw, I take for the first batch about nine hundred pounds soda-ash, and make it caustic by boiling it with about four barrels lime, and allow it to settle, when I draw off the supernatant liquor, and unite by boiling with it about one hundred pounds potash and eight gallons oil. I prefer cotton-seed oil to any that I have used, as it preserves my liquor thinner and purer. This liquor I then run into the vessel containing the straw, and add enough water to fill the vessel two-thirds or three-fourths full. Then I apply heat and cause it to boil slowly for about four or five hours, or long enough to have the most stubborn parts thoroughly subdued. During the boiling I keep lifting the liquor from the bottom of the vessel and make it flow over the top of the straw or other material, and, percolating through it, find its way back to the bottom of the vessel again. When the material is sufficiently cooked I draw off the liquor into a receiver or reservoir, where it is held convenient for using again. As this liquor is not adulterated with silica and other proximates it remains caustic; and for the second and all subsequent batches I add a new liquor, made with about four hundred pounds soda-ash rendered caustic by boiling with about two barrels lime and drawn off clear after settling, to which I add, by boiling, about fifty pounds potash and six gallons oil. More or less may be used, according to the nature of the material to be acted upon. I think it may be done with less chemicals, but I have thus far kept up the strength to insure a good result. The stock is taken out of the vessel and washed in the washing-engine ordinarily used for similar purposes, and beat and bleached the same as stock prepared by any of the ordinary processes.

Esparto, palm-leaf, okra, bamboo or reed, palmetto, and many other like fibrous substances which will not yield readily to processes before in use, are easily subdued by mine.

By my process all weeds, such as thistles, dock, &c., the presence of which in straw has hitherto caused great difficulty in treating it, are perfectly subdued without injury to the other stock. Where the fiber is sufficiently long I can prepare it so that it can be spun into rope or woven into cloth.

I am aware that it is common to boil fibrous materials in caustic saponaceous solutions; but this I do not claim.

My solution is not a soap. The oil is not mixed with the alkali at first, so as to form a saponaceous compound, nor is it used in saponifiable proportions, but, being added to the alkaline solution, remains free, and operates with beneficial effect in protecting the fiber from injury by the chemicals.

The addition of potash to the caustic-soda solution is necessary to completely subdue such fibrous materials as abound in silica. The proportion of potash employed may be varied, and it is expedient to use it in larger proportions with such materials as contain most silica.

I do not claim the addition of grease or saponifiable fats to the alkaline liquor in which fibrous materials are treated for the manufacture of paper-pulp.

Having thus described my invention, what I claim as new, and desire to secure by Letters Patent, is—

1. The process of treating fibrous material by cooking it without pressure or agitation in a solution of caustic soda, potash, and oil, then drawing off the liquor in a caustic state for future use, and subsequently washing the material in separate water, all as herein described, whereby the silica and other proximates are changed in their chemical condition without changing their mechanical relations to the fiber, but are left to surround and protect the fiber until after the chemical solution is withdrawn.

2. The liquor consisting of a solution of caustic soda, potash, and oil, substantially as and for the purposes set forth.

In testimony that I claim the above I have hereunto subscribed my name in the presence of two witnesses.

JOHN CAMPBELL.

Witnesses:
   EDGAR O. HOWLAND,
   GEO. W. MANCIUS.